Sept. 1, 1964  R. G. GREENLER  3,147,430
APPARATUS USING LIQUID ELECTRODES FOR MEASURING THE
ELECTRIC BREAKDOWN STRENGTH OF THIN FILMS
Filed Feb. 5, 1962  3 Sheets-Sheet 1
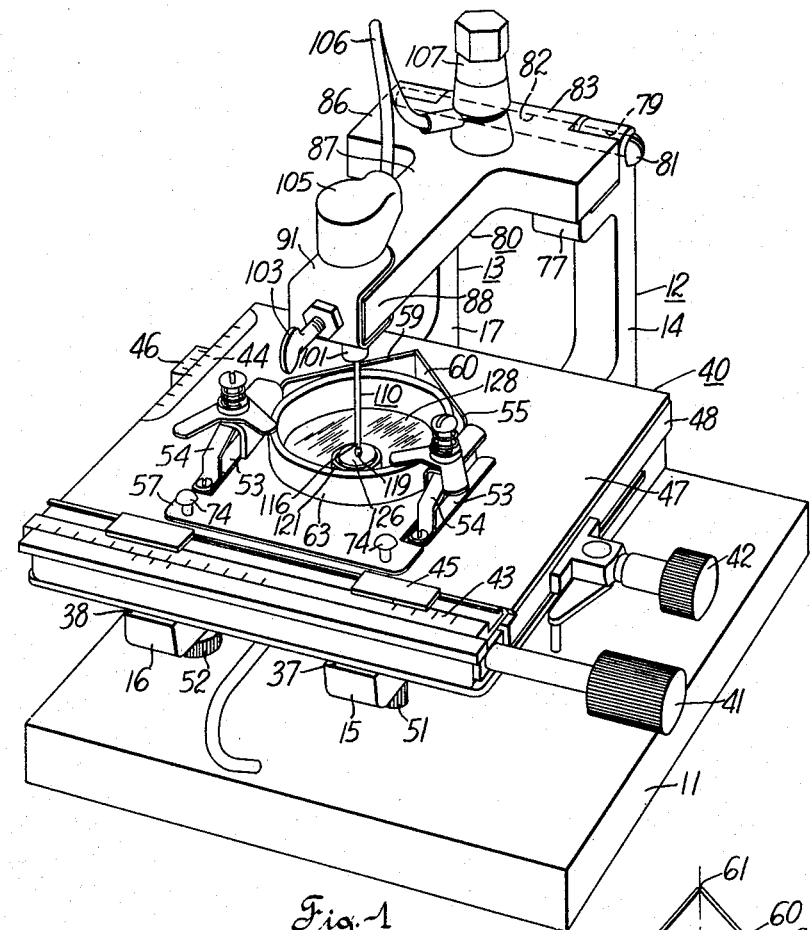
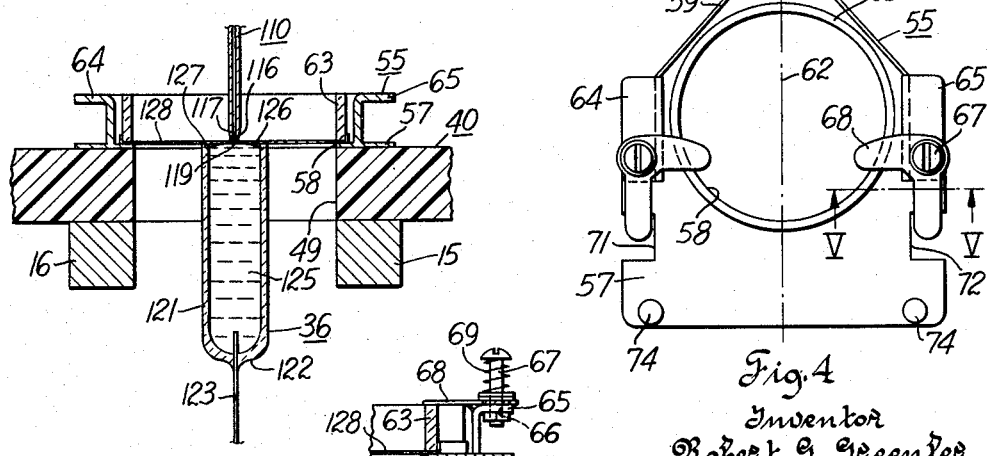
Fig. 1
Fig. 3
Fig. 4
Fig. 5
Inventor
Robert G. Greenler
by Richard R. Mybeck
Attorney

United States Patent Office 3,147,430
Patented Sept. 1, 1964

3,147,430
APPARATUS USING LIQUID ELECTRODES FOR MEASURING THE ELECTRIC BREAKDOWN STRENGTH OF THIN FILMS
Robert G. Greenler, Waukesha, Wis., assignor to Allis-Chalmers Manufacturing Company, Milwaukee, Wis.
Filed Feb. 5, 1962, Ser. No. 170,882
9 Claims. (Cl. 324—54)

The present invention relates to a method and apparatus for measuring the electric breakdown strengths of single and laminated films and is especially suited, though not limited, to measuring such strengths in films ranging in thickness from 1200 to 50,000 angstrom units.

The prior art techniques for measuring the electrical breakdown strengths have been found quite unsatisfactory for use with films ranging in thickness from 1200 to 50,000 angstrom units because they created localized pressure points and mechanically damaged the film during measurement, caused thermal and chemical damage to the film and gave high local values to the electric field which caused premature breakdown. Consequently a need exists for a method and apparatus to make the measurements on films in this range of thicknesses.

Accordingly, one of the primary objects of the present invention is to provide improved methods of novel apparatus for accurately and easily measuring the electric breakdown strength of single and laminated films ranging in thickness from 1200 to 50,000 angstrom units.

Another important object of the present invention is to provide apparatus for making measurements of electric breakdown strengths of films in which the components of the apparatus avoid localizing high pressures or doing mechanical damage to the film being measured.

Still another object of the present invention is to provide apparatus for measuring breakdown strength in which the components of the apparatus produce no thermal or chemical damage to the film.

Another object of the present invention is to provide apparatus having components which avoid giving high local values to the electric field which would otherwise cause premature breakdown.

Another object of the present invention is to provide apparatus which gives a clear and positive indication of when breakdown has occurred and the characteristic of the electric field at that time.

These and still further objects of the present invention as shall hereinafter appear are fulfilled by the present invention in a remarkably unexpected fashion as will be readily discerned from the following detailed description of a preferred embodiment of the present device and method, especially when considered in conjunction with the accompanying drawing in which:

FIG. 1 is a perspective showing of a device embodying the present invention;

FIG. 3 is a cross sectional view taken along line III—III of FIG. 2 illustrating the relative relationship of the electrodes to the film being measured during operation of the device of FIG. 1;

FIG. 4 is a plan view of the specimen holder of the device of FIG. 1;

FIG. 5 is a cross sectional view taken along line V—V of FIG. 4;

Referring initially to the method of the present invention, the electrical breakdown tests are achieved by applying an increasing voltage between two liquid electrodes across the film until breakdown occurs.

Figure 6:
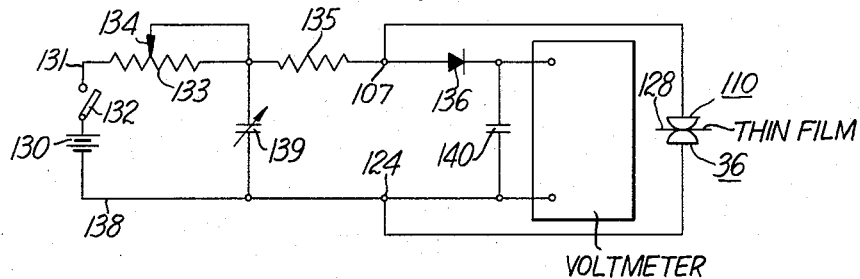
FIG. 6 is a schematic diagram of the electrical circuit of the device of the present invention.

The circuit, as shown in FIG. 6, applies and measures the breakdown voltage. Resistance 134 and capacitance 139 are adjusted to give approximately the same rise to breakdown five to eight seconds, for films of various thicknesses. Keeping the rate of increase of the electric field constant in this manner, I am able to avoid the slow variation of breakdown strength with pulse duration which was described by Inuishi and Powers (see J. Appl. Phys. 28, 1017 (1957)). Breakdown voltage is read from the electronic voltmeter. To facilitate reading, maximum voltage across the voltmeter is temporarily maintained after breakdown by capacitor 140 which is blocked from discharge through the film by the diode 136.

Any suitable technique for measuring the thicknesses of films may be employed such, for example, as using the interference fringes of equal chromatic order. The thickness of the film is calculated from the position of the interference maxima (or minima) in the spectrum of white light reflected from the film.

Figure 2:
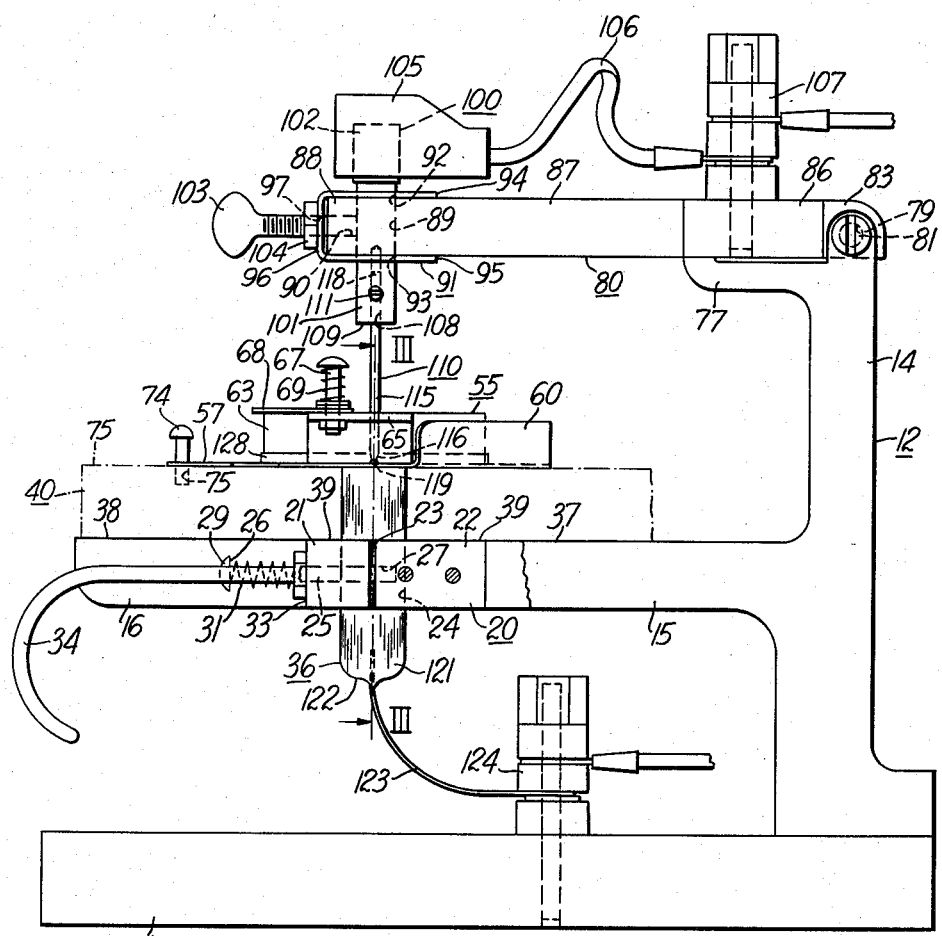
FIG. 2 is a side elevation of the device of FIG. 1 with the stage removed for clarity.

Referring now to FIGS. 1 and 2, a device exemplifying the present invention is shown and comprises a base member 11 upon which are mounted support members 12, 13. Each support member, for example member 12, has a body portion 14 extending vertically from base member 11 and an elongated arm portion 15 extending generally normal from body portion 14 in spaced relationship to base 11.

Interposed between arm portion 15 of member 12 and a like arm portion 16 similarly extending from a corresponding body portion 17 of support member 13 is a spring biased vise means 20. Vise means 20 is secured to arm portions 15, 16 and comprises first and second segments 21, 22 which meet in a common plane, interface 23. A cylindrical aperture 24 is defined in and extends through vise means 20. Aperture 24 is arranged so that its vertical axis of symmetry lies approximately in the plane of interface 23. In this manner, segment 21 and segment 22, when in abutting engagement with each other, coact to define aperture 24.

A pair of suitable bolts 25, 26 extend through segment 21 and are suitably secured in segment 22 as by engagement with threaded bores 27 which are defined therein. Each bolt, for example bolt 26, is provided with an enlarged head 29. A suitable compression spring 31 is interposed between head 29 and outer surface 33 of segment 21 and is disposed in circumscribing relationship about the shank of the bolt. FIG. 2 shows the arrangement with respect to bolt 26, it being understood that the arrangement for effecting a spring bias on bolt 25 is similarly constructed.

Suitable handle means, such as hook 34, extends outwardly from segment 21 for drawing segments 21, 22 apart relative to each other to permit the insertion and adjustment of an electrode 36 therebetween. Electrode 36 shall hereinatfer be described in detail. Electrode 36 is held in aperture 24 by segments 21, 22 acting in response to the spring bias just described. Thus, when handle means 34 is released, springs 31 bias segment 21 toward segment 22 and into engagement with electrode 36 which is thus clamped thereby.

Arm portions 15, 16 have, respectively, top surfaces 37, 38 which are coplanar with top surface 39 of vise means 20 and coact therewith to define a deck for supporting a specimen stage 40.

Stage 40 may be any convenient specimen support such as microscope stage shown in FIG. 1. The stage illustrated is a mechanical stage equipped with two mutually perpendicular drives 41, 42 having scales 43, 44 and verniers 45, 46, respectively, to permit bidirectional traversing. In operation, the mutually perpendicular drives 41, 42 cause the upper surface 47 to move relative to the bottom surface 48 which is secured to surfaces 37, 38 by bolts 51, 52, respectively. The bolts 51, 52 extend upwardly through arm members 15, 16 and are secured, as by threaded engagement, to deck 40 through surface 48. The relative movement of surfaces 47, 48 permits the selective alignment of the specimen to be measured as shall hereinafter be more fully described.

Stage 40 further defines an opening 49 which extends centrally and completely therethrough. The full significance of opening 49 shall be hereinafter described. In addition, stage 40 is provided with specimen stops 53 and stage clips 54 which coact, as will be described, to hold the specimen holder 55 relative to surface 47.

A suitable stage for purposes of this disclosure is the mechanical stage No. 22, manufactured by C. Reichert Optische Wearke AG, Wien XVII, Hernalser Hauptstrasse 219.

The art of indexing is, of course, well developed and it is not intended that the present invention be limited to any specific mechanism for achieving this desideratum. Indeed, under appropriate circumstances manual indexing can be useful.

Specimen holder 55, which is movable with both lateral and longitudinal components by virtue of being secured to stage surface 47 by clips 54, shall now be described.

Specimen holder 55, see FIGS. 1, 2 and 4, comprises a base plate 57 having a circular opening 58 defined therethrough and a pair of upstanding flanges 59, 60 converging at approximately right angles to each other adjacent one end of the plate 57 to define an apex 61. Flanges 59, 60 are disposed in such a manner that they are respectively parallel to tangents of circular opening 58 which intersect on the axis of symmetry 62 of base plate 57. In this fashion, circular film frame 63 (see FIG. 4) is caused to be placed in substantially identical positions each time it is inserted into holder 55. Film frame 63 will be described in detail later.

Equally spaced from and generally parallel to the center line 62 of a base plate 57 are side flange members 64, 65 shaped, when viewed in elevation, in the form of inverted L's. Each flange member, for example member 65 (see FIG. 5), contains a threaded bore 66 extending therethrough which coacts with bolt 67 to pivotally attach locking member 68 to the flange. A compression spring 69 is interposed between the head of bolt 67 and the upper surface of locking member 68 to urge locking member 68 downwardly and hold film frame 63 firmly in its desired position against base plate 57 irrespective of slight variations in frame thickness.

Notches 71, 72 are defined in base plate 57 adjacent flanges 64, 65 and are complementary to clips 54 on the stage 40. Clips 54 coact within indexing pins 74, which protrude below base plate 57 and are engaged in appropriate recesses 75 defined in upper surface 47 of specimen stage 40, to position the specimen holder 55 relative to the stage 40.

Referring again to support members 12, 13 (see FIGS. 1 and 2), each, for example member 12, is provided with an inwardly extending platform 77 disposed generally parallel (though not critically so) to arm portion 15. The corresponding platform of member 13 is not visible in the drawing. Above platform 77, members 12, 13 are each provided with a laterally (relative to FIG. 1) extending bore 79 (one not visible), the function of which will be described.

An upper electrode holder 80 is pivotally attached to members 12, 13 by the insertion of a suitable shaft 81 through bore 79 and bore 82 which extends through end portion 83 of holder 80. Shaft 81 is then prevented from axial movement by suitable retaining means, such, for example, as by the integral enlarged head as shown or by a detachable nut (not shown), operatively disposed at each end thereof.

With shaft 81 thus secured, holder 80 is pivotable thereabout into and out of seated engagement with the platforms 77 (one not shown).

Upper electrode holder 80 is preferably in the shape of a cross with the cross bar 86 engageable with platforms 77 (one not shown) to limit the downward movement of the electrode holder 80.

The narrower body portion 87 of holder 80 is sufficiently elongated to overreach the platforms 77 (one not shown). Thus, when cross bar 86 is in engagement with platforms 77, the end 88 of holder 80 extends beyond vise means 20. Adjacent end 88 of body portion 87, a vertically extending aperture 89 is defined through portion 87 and it is intersected by an axially extending bore 90 defined inwardly from the end 88. A U-shaped bracket 91 is disposed over the portion of body portion 87 adjacent end 88 in such a manner that holes 92, 93 defined respectively in leg portions 94, 95 of bracket 91 lie in axial registry with aperture 89. The bottom portion 96 of bracket 91 is also provided with a threaded opening 97 which, when bracket 91 is properly positioned, is in registry with axially extending bore 90.

A stepped electrode bushing 100 having a first cylindrical portion 101 having a diametric dimension slightly less than the diameter of aperture 89 and a second cylindrical portion 102 having a diametric dimension greater than the diameter of aperture 89 is inserted into aperture 89. The extent of the penetration of the bushing 100 into aperture 89 can, as will appear, be varied throughout the axial length of the smaller cylindrical portion 101.

A threaded bolt 103 is screwed through threaded opening 97 in bottom portion 96 of bracket 91 into axial extending bore 90. Bolt 103 may be turned in opening 97 until it engages the outer surface of cylindrical portion 101 whereupon lock nut 104 is tightened and bushing 100 is locked in the desired vertical position. The larger cylindrical portion 102 of bushing 100 is connected by means of a cap connector 105 and lead 106 to a terminal post 107 disposed on holder 80 adjacent cross bar 86.

Bushing 100 is further provided with an axial bore 108 extending inwardly from bottom surface 109 into which an electrode 110 may be inserted and held in any suitable fashion as by a setscrew 111 disposed radially in cylindrical portion 101 and extendable into engagement with electrode 110.

In accordance with a preferred practice of the present invention, electrode 110 comprises an elongated body portion 115 and an end portion 116 which, preferably, is tapered to an axial opening 117 extending at least partially into body portion 115. If desired, the entire electrode 110 may be tubular although it is preferred that the head portion 118, which is insertable into bushing 100, be solid to permit the better use of setscrew 11. Electrode 110 may be formed of any suitable conductive material such, for example, as copper and silver.

Electrode 110 further comprises a small ball of mercury 119 disposed across the opening 117 and carried on the tip thereof by its own surface tension. In operation, mercury ball 119 will be brought into nonpenetrating engagement with film 128.

As indicated, the electrode 110 is electrically connected to terminal 107 which is carried by electrode holder 80.

The lower electrode 36 which, as previously indicated, is secured by vise means 20, comprises tube 121 having a closed end 122 through which passes an electrically conductive wire 123 extending from within tube 121 for connection to a second terminal post 124 externally thereof. While glass is a satisfactory material from which to make tube 121, any material may be employed which does not react with the electrode liquid for which mercury will be considered exemplary. Electrode 36 further comprises a mercury column 125 disposed within the tube 121 so that its outwardly convex meniscus 126 extends above the upper edge 127 of the tube 121 and will gently engage the lower surface of film 128.

Electrode 36 passes through opening 49 in stage means 40 (see FIG. 3).

I shall now describe my film frame 63 and certain techniques I have found especially successful in disposing a film sample 128 on the frame.

In its preferred form, film frame 63 comprises a relatively inflexible annular ring which may be formed of glass, styrene, lucite, porcelain, brass, steel, and the like.

The film to be measured is disposed across an end of frame 63. When it is desired to obtain measurements of laminar film, each of the several lamina will be disposed upon frame 63 in the same manner.

Figure 7:
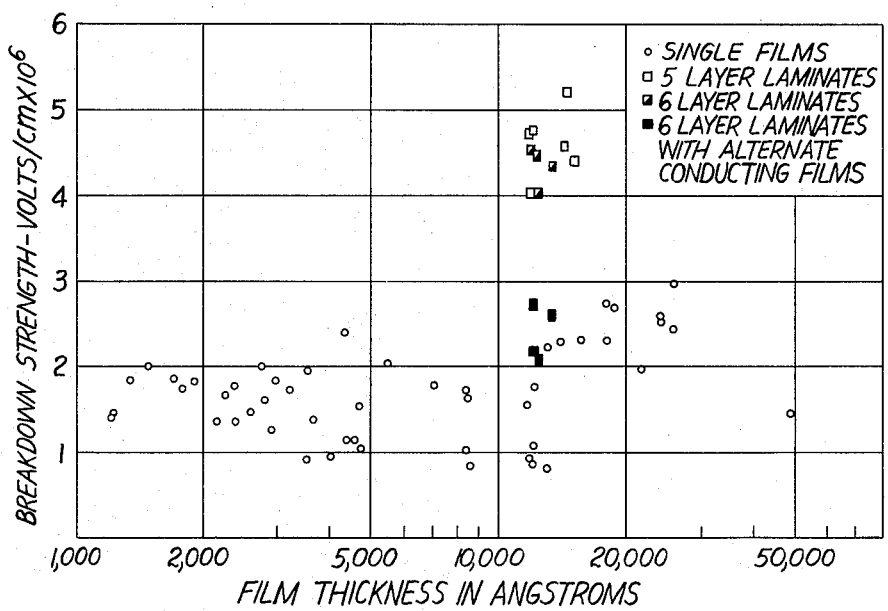
FIG. 7 is a representative plot of breakdown strength versus film thickness (on a logarithmic scale) of several samples measured in accordance with the method of the present invention.

Films of the type measured by the present device and recorded in FIG. 7 are made of vinyl chloride-acetate copolymer dissolved in dichloroethane although it is of course understood that measurements may be obtained for any film.

In operation, the film on the film frame 63 is placed in the specimen holder 55 on the microscope stage 40. The measuring sequence shall be hereinafter described.

To the apparatus as described is connected through terminal posts 107 and 124 the circuit (see FIG. 6) which provides a linearly increasing voltage across the film until the breakdown occurs. The circuit comprises a power source 130 connected by a first lead 131 through switch 132 to variable resistor 133. The tap 134 of resistor 133 is connected in series with fixed resistor 135, terminal 107, diode 136 and, hence, to the voltmeter.

The second power lead 138 is connected to the voltmeter. A variable capacitor 139 is connected in parallel across the power leads, between resistors 133 and 135 in the first lead, and between power source 130 and terminal 124 in the second lead. A second capacitor 140 is connected in parallel across the same leads, between diode 136 and the voltmeter in the first lead and between terminal 124 and the voltmeter in the second lead. The sample, as mentioned, is disposed between electrodes 36, 110 which are connected in parallel across the leads between terminals 107 and 124.

In operation, the variable resistance 133 and the variable capacitance 139 are adjusted to give approximately the same time rise to breakdown for films of various thicknesses. A time rise of approximately five to eight seconds has been found satisfactory. The breakdown voltage is read from the electronic voltmeter. To facilitate reading, the maximum (breakdown) voltage across the voltmeter is temporarily maintained by capacitor 140 which is blocked from discharge through the film by the diode 136.

FIG. 7 shows the results of breakdown tests on fifty samples from thirty-seven different single plastic films ranging in thickness from 1200 to 50,000 angstrom units. These data are plotted in open circles. Each point represents a mean of about twenty-five separate breakdown tests in the small area surrounding the point at which the thickness measurement was made.

Also shown in FIG. 7 are the test results of six composite films, each consisting of five laminated films. These data are ploted as open squares.

Another set of composite films was prepared in which half of each film was given a light coating of silver by thermal evaporation of silver in a high vacuum system while the other half of the film was left uncoated. Six of these films were laminated to form a single composite film. Half of the film, the composite film, then consisted of six laminated plastic layers interleaved with five thin conducting layers of silver while the other half consisted of the same films without conducting layers. The measurement of four such composites are shown in FIG. 7. The test results on the region containing the conducting layers are shown by solid squares while the results on the region not containing conducting layers are shown by half-solid squares.

In operation, the desired film 128 is suitably affixed to film frame 63 which is seated in specimen holder 55 which in turn is mounted on the adjustable calibrated stage 40. Stage 40, as previously indicated, is linearly movable in two directions so that it can readily position the film in the thickness measuring optical system. By means of the calibrated screw motion of the stage, the same points of the film can be accurately located for breakdown testing as were previously located for thickness measurements.

Electrical contact is made to the film through the mercury electrodes 36, 110. The lower electrode 36 is the pool formed by mercury column 125. Normally, the pool will be approximately one centimeter in diameter. The upper electrode 110, as previously indicated, comprises a drop of mercury 119 contained in and by the hollow tip 116 of the conductive (e.g., copper) electrode. The diameter of contact area of the upper mercury electrode 110 is less than a millimeter. Both mercury electrodes may conveniently be freed from dust particles by gently pressing a strip of pressure sensitive adhesive tape onto the surface. The circuit is activated by the closing switch 132 whereupon an increasing voltage is applied across film 128.

When breakdown voltage is reached, the electrodes short out through the film and give positive indication that the breakdown has occurred. The voltage is then readable upon the electronic voltmeter because of the previously described action of capacitor 140 and diode 136.

Mercury has been used throughout this description to exemplify a liquid electrode at room temperature. It is, however, obvious that liquid bismuth, salt water and other electrically conductive liquids may be used in lieu of the mercury column when the nature of the film being measured will permit.

From the foregoing, it becomes apparent that an apparatus and method are herein described which unobviously fulfill all of the aforestated objectives to a remarkably unexpected extent. It is, of course, understood that such modification, alterations, and applications, as may readily occur to the artisan when confronted with this disclosure, are intended within the spirit of this invention, especially as it is defined by the scope of the claims appended hereto.

What is claimed is:

1. Apparatus for measuring breakdown strength of thin films comprising in combination: means supporting a film for measurement; first electrode means disposed on one side of said supporting means and having an electrically conductive liquid tip engageable in nonpenetrating relationship to a film supported thereby; second electrode means disposed on the opposite side of said supporting means and having a film-engaging surface of a conductive liquid engageable with in nonpenetrating relationship to the film and being in spaced relationship to said first electrode means; and means for providing a measurable voltage across said electrodes.

2. Apparatus for measuring breakdown strength of thin films comprising in combination: means supporting a film for measurement; first electrode means disposed superjacent to said supporting means and having a mercury tip engageable in nonpenetrating relationship to a film supported thereby; second electrode means disposed subjacent to said supporting means and having an enlarged film-engaging surface of mercury engageable with in nonpenetrating relationship to the film and being in spaced relationship to said first electrode means; and means providing a measurable voltage across said electrodes.

3. Apparatus for measuring breakdown strength of thin films comprising in combination: means supporting a film for measurement; first electrode means disposed superjacent to said supporting means and having an electrically conductive liquid tip engageable in nonpenetrating relationship to a film supported thereby; second electrode means disposed subjacent to said supporting means and having a convex mercury meniscus engageable with in nonpenetrating relationship to the film and being in spaced relationship to said first electrode means; and means providing a measurable voltage across said electrodes.

4. Apparatus for measuring breakdown strength of thin films comprising in combination: means supporting a film for measurement; first electrode means disposed superjacent to said supporting means and having a mercury tip engageable in nonpenetrating relationship to a film supported by said supporting means; second electrode means disposed subjacent to said supporting means and having a convex mercury meniscus engageable with in nonpenetrating relationship to the film and being in spaced relationship to said first electrode means; and means providing a measurable voltage across said electrodes.

5. Apparatus for measuring breakdown strength of thin films comprising in combination: support means carrying a film to be measured; a first axially adjustable electrode member carried by said support means in superposition to said film, said first member having a ball of mercury disposed at one end thereof engageable in nonpenetrating relationship with the upper surface of said film; a second axially adjustable electrode member carried by said support means beneath said film, said second member having a convex meniscus of mercury engageable with the lower surface of said film; electrical means connected to said upper and lower electrode members and adapted to provide a variable voltage across said film; and recording means for indicating the voltage thereof upon breakdown of said film.

6. Apparatus for measuring breakdown strength of thin films comprising in combination: support means; traversable stage means carried by said support means; a first axially adjustable electrode member carried by said support means in superposition to said stage means, said first member having an elongated body portion, an axial opening defined in one end of said body portion, and a ball of mercury disposed over said opening, said ball of mercury being engageable with the upper surface without penetration of a film disposed upon said stage means; a second axially adjustable electrode member carried by said support means beneath said stage means, said second member comprising a hollow tube filled with sufficient mercury to provide a convex meniscus engageable with a lower surface of a film disposed upon said stage means; electrical means connected to said upper and lower electrode members and adapted to provide a variable voltage thereacross; and recording means for indicating the voltage thereof upon breakdown of the film.

7. Apparatus for measuring breakdown strength of thin films comprising in combination: a base member; a pair of upstanding body members secured to said base member and having inwardly extending intermediate arm members, inwardly extending upper arm members, and pivot means superposed with said upper arm members; an electrode holder connected to said body members by said pivot means and engageable with said upper arm members; traversable stage means carried by said intermediate arm members; first axially adjustable electrode member carried by said electrode holder in superposition to said stage means, said electrode member having a ball of mercury disposed at one end thereof for nonpenetrating engagement with a film positioned upon said stage means; vise means interposed between and carried by said intermediate arm members; a second axially adjustable electrode member carried by said vise means beneath said stage means and having a convex mercury meniscus extendable through said stage means into nonpenetrating engagement with the film; electric means connected to said upper and lower electrode members and providing a variable voltage thereacross; and recording means for indicating the voltage thereof upon breakdown of the film.

8. Apparatus for measuring breakdown strength of thin films comprising in combination: means supporting a film for measurement; first electrode means disposed superjacent to said supporting means and having an electrically conductive liquid tip engageable in nonpenetrating relationship to a film supported thereby; second electrode means disposed subjacent to said supporting means, said second electrode means having a hollow casing and a mercury column disposed in said casing, said column defining with said casing a convex meniscus having an enlarged film-engaging surface engageable with in nonpenetrating relationship to the film in spaced relationship to said first electrode means; and means providing a measurable voltage across said electrode means.

9. Apparatus for measuring breakdown strength of thin films comprising in combination: means for supporting a film for measurement; first electrode means disposed superjacent to said supporting means and having a mercury tip engageable in nonpenetrating relationship to a film supported thereby; second electrode means disposed subjacent to said supporting means and having an enlarged film engaging surface of electrically conductive liquid engageable with in nonpenetrating relationship to the film and being in spaced relationship to said first electrode means; and means providing a measurable voltage across said electrodes.

References Cited in the file of this patent

UNITED STATES PATENTS

| 2,572,597 | Connor | Oct. 23, 1951 |
| 3,045,176 | Voltmann | July 17, 1962 |

OTHER REFERENCES

Bragg et al.: J. Appl. Phys., vol. 25, No. 3, March 1954, pp. 382-91; page 388 relied on.

Greenler, Robert G. and Kay, Robt. M.: J. Appl. Phys., 32, July 1961, 1252-55.